(12) United States Patent
Nemoto et al.

(10) Patent No.: US 12,539,363 B2
(45) Date of Patent: Feb. 3, 2026

(54) INJECTION SYSTEM, DATA CREATION METHOD, AND DATA CREATION PROGRAM

(71) Applicant: Circulus Inc., Tokyo (JP)

(72) Inventors: Shigeru Nemoto, Tokyo (JP); Yumiko Fukikoshi, Tokyo (JP); Toshio Kanetaka, Tokyo (JP)

(73) Assignee: Circulus Inc., Tokyo (JP)

( * ) Notice: Subject to any disclaimer, the term of this patent is extended or adjusted under 35 U.S.C. 154(b) by 766 days.

(21) Appl. No.: 17/792,337

(22) PCT Filed: Jan. 15, 2021

(86) PCT No.: PCT/JP2021/001345
§ 371 (c)(1),
(2) Date: Sep. 12, 2022

(87) PCT Pub. No.: WO2021/145448
PCT Pub. Date: Jul. 22, 2021

(65) Prior Publication Data
US 2023/0051914 A1   Feb. 16, 2023

(30) Foreign Application Priority Data

Jan. 17, 2020 (JP) .................................. 2020-005788

(51) Int. Cl.
*A61M 5/172* (2006.01)
*G16H 20/17* (2018.01)
*G16H 30/20* (2018.01)

(52) U.S. Cl.
CPC ............ *A61M 5/172* (2013.01); *G16H 20/17* (2018.01); *G16H 30/20* (2018.01)

(58) Field of Classification Search
None
See application file for complete search history.

(56) References Cited

U.S. PATENT DOCUMENTS 4,546,777 A * 10/1985 Groch ...................... A61B 7/04
600/528
5,482,046 A * 1/1996 Deitrich .............. G01S 7/52096
600/458
2014/0073919 A1* 3/2014 Ortenzi ................... G16Z 99/00
600/431

(Continued)

FOREIGN PATENT DOCUMENTS

| JP | 04317631 A | 11/1992 |
| JP | 2011177399 A | 9/2011 |
| JP | 2012217632 A | 11/2012 |

(Continued)

*Primary Examiner* — Manuel A Mendez
(74) *Attorney, Agent, or Firm* — Leason Ellis LLP; Jordan Garner; Mitsuhiro Haraguchi (57) ABSTRACT

An injection system has: an injection device that injects a drug solution; and a sound detection device that detects sound while a subject is being imaged and generates first data based on the sound, wherein the injection device has a data generation unit that acquires the first data, and a history generation unit that generates injection history data of the drug solution, and the data generation unit generates second data in which the first data is associated with time data in common with the injection history data.

8 Claims, 5 Drawing Sheets

(56) References Cited

U.S. PATENT DOCUMENTS

2014/0276549 A1* 9/2014 Osorio .................. A61B 5/165
                                                      604/503
2017/0209027 A1 7/2017 Raj et al.

FOREIGN PATENT DOCUMENTS

| JP | 2013169358 A | 9/2013 |
| JP | 2015503153 A | 1/2015 |
| JP | 2018000307 A | 1/2018 |
| WO | 2013075127 A1 | 5/2013 |
| WO | 2014168216 A1 | 10/2014 |

\* cited by examiner

INJECTION SYSTEM, DATA CREATION METHOD, AND DATA CREATION PROGRAM

CROSS-REFERENCE TO RELATED PATENT APPLICATIONS

This application is a U.S. National Phase Application under 35 U.S.C. § 371 of International Patent Application No. PCT/JP2021/001345 filed on Jan. 15, 2021 and claims the benefit of priority to Japanese Patent Application No. 2020-005788 filed on Jan. 17, 2020, the contents of all of which are incorporated herein by reference in their entireties. The International Application was published in Japanese on Jul. 22, 2021 as International Publication No. WO 2021/145448 under PCT Article 21(2).

FIELD OF THE INVENTION

The present invention relates to an injection system, data generation method, and data generation program for generating data associated with time data in common with injection history data.

BACKGROUND OF THE INVENTION

A data processing device is known that acquires timing data for an exposure time in imaging and inspection and injection history data for drug solution injection, generates an injection result graph that displays the injection history data and the timing data for the exposure time together, and displays this graph on a display unit (WO 2014/168216). This data processing device acquires timing data of the exposure time generated by an imaging device from a storage unit of the imaging device or a PACS (picture archiving and communication system).

Examples of timing data of the exposure time include data of an imaging start time and data of an imaging end time. Furthermore, because an injection start time of a contrast medium and the imaging start time may not match, the injection result graph is preferably generated based on common time data. For example, time data of an NTP (network time protocol) server, time data of other time servers for which time is set based on the NTP server, time data of a predetermined device for which time is set based on these servers, and time data of an imaging device for which time is set based on these servers can be used as the time data assigned by the imaging device.

CITATION LIST

Patent Literature

PATENT LITERATURE 1: WO 2014/168216

Technical Problem

However, few medical institutions have integrated NTP servers, and therefore, the use of data associated with time data in common with injection history data is limited. Meanwhile, injection devices and imaging devices each generate time data. However, when the time data is not synchronized, the time gap between the injection device and the imaging device is large. Therefore, it has not been possible to use the data of the injection start timing and the imaging timing in accurate correlation.

SUMMARY OF THE INVENTION

Solution to Problem

In order to solve the problem, an injection system serving as an example of the present invention comprises: an injection device that injects a drug solution; and a sound detection device that detects sound while a subject is being imaged and generates first data based on the sound, wherein the injection device has a data generation unit that acquires the first data, and a history generation unit that generates injection history data of the drug solution, and the data generation unit generates second data in which the first data is associated with time data in common with the injection history data.

Furthermore, a data generation method according to one aspect of the present invention is a data generation method that causes a computer to generate data that is associated with time data in common with injection history data of a drug solution, the data generation method comprising: detecting sound while a subject is being imaged; acquiring first data based on the sound; generating the injection history data; and generating second data in which the first data is associated with the time data in common with the injection history data.

Furthermore, a data generation program according to one aspect of the present invention is a data generation program that causes a computer to generate data that is associated with time data in common with injection history data of a drug solution, the data generation program causing the computer to function as: a data generation unit that acquires first data based on sound during imaging of a subject; and a history generation unit that generates the injection history data, wherein the data generation unit generates second data in which the first data is associated with the time data in common with the injection history data.

Advantageous Effects of Invention

Thus, the injection system can generate data associated with time data in common with injection history data of the drug solution. Furthermore, by using this data, the injection history data and the imaging timing can be utilized based on the common time data.

Further features of the present invention will become apparent from the following description of the embodiments illustrated by way of examples with reference to the accompanying drawings.

DETAILED DESCRIPTION OF THE INVENTION

Hereinafter, exemplary embodiments for carrying out the present invention will be described in detail with reference to the drawings. However, the dimensions, materials, shapes and relative positions of the components described in the following embodiments can be arbitrary set and can be changed according to the configuration of an apparatus to which the present invention is applied or to various conditions. Unless otherwise specified, the scope of the present invention is not limited to the embodiments specifically described below.

Except as specifically noted, the term contrast medium includes both a contrast medium alone and a drug solution that includes, in addition to the contrast medium, other solvents and additives. Furthermore, hereinafter, except as specifically noted, the term pixel value includes, in the imaged portion being imaged, a CT value, a sum of or an average value of the CT values of pixels included in a region of interest (ROI), or an SD value (standard deviation value) of the region of interest. Moreover, pixel value includes a value obtained by subtracting a value in an imaging portion that is not contrasted (for example, a CT value of an imaging portion in a simple CT) from these values. The region of interest is set in advance, or the user can select the region of interest.

First Embodiment

Figure 1:
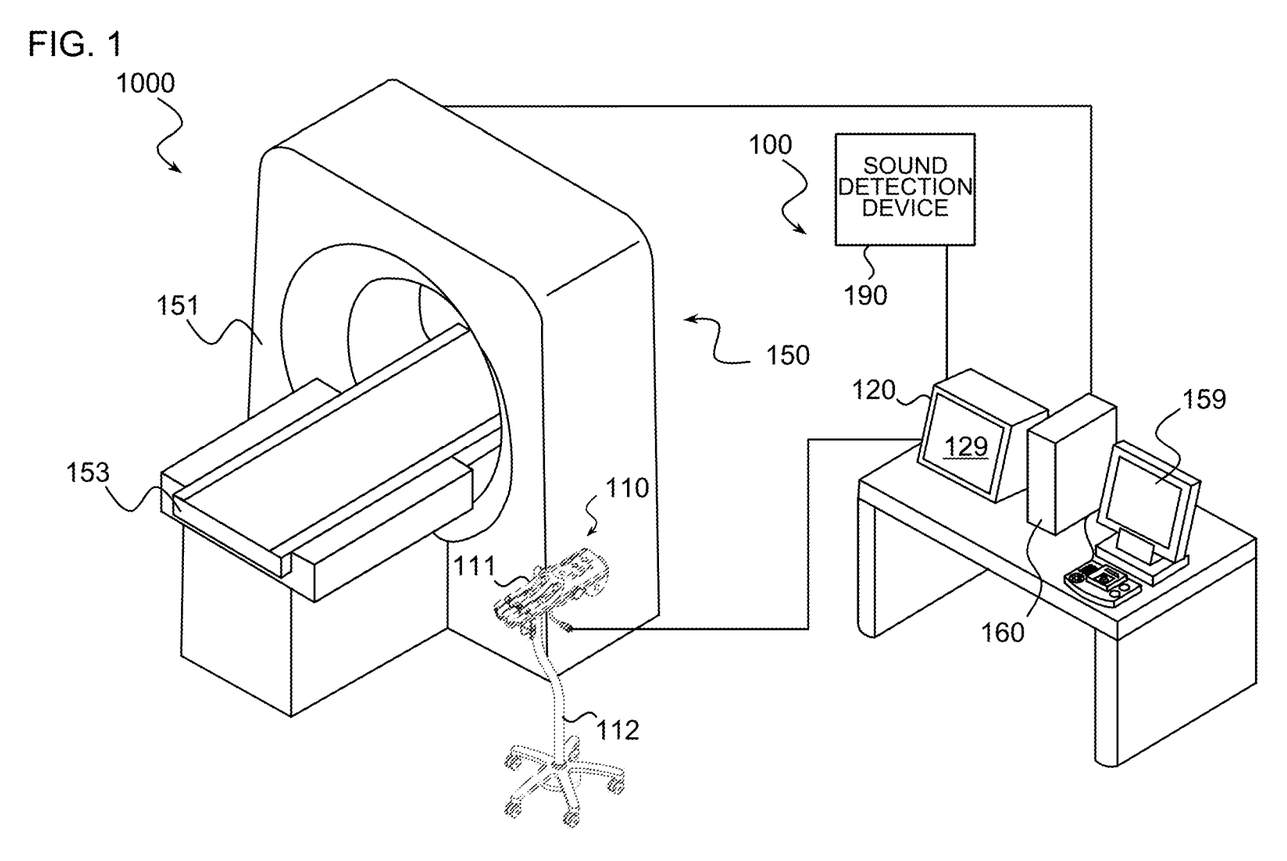
FIG. 1 is a schematic overall view of an injection system.

As illustrated in FIG. 1, a data generation system 1000 is provided with an injection system 100 having an injection device 110 for injecting a drug solution and a medical imaging device 150 that is connected by wire or wirelessly to the injection device 110 and that images a subject. Moreover, the data generation system 1000 may be further provided with an external storage device such as a PACS, an RIS (radiology information system), or an HIS (hospital information system), and a data generation device such as an image generation device, a computer, or a workstation.

Examples of the imaging device 150 include various medical imaging devices such as an MRI (magnetic resonance imaging) device, a CT (computerized tomography) device, an angio imaging device, a PET (positron emission tomography) device, a SPECT (single photon emission computerized tomography) device, a CT angio device, an MR angio device, an ultrasonic diagnostic device, and a blood vessel imaging device. Furthermore, the injection system 100 is provided with the injection device 110 for injecting the drug solution and a sound detection device 190 for detecting sound during imaging of the subject, generating first data based on the sound, and transmitting it to the injection device 110. As an example of imaging-related sound described later, the sound detection device 190 detects a notification sound emitted by a control device 160 of an imaging device 150 while a subject is being imaged. An example in which the imaging device 150 is a CT device will be described below.

The imaging device 150 and the injection device 110 are connected by wire or wirelessly via a local area network (LAN), a leased line, or the like, respectively, and can transmit and receive various data to and from each other. This data can be generated in conformity to DICOM (digital imaging and communications in medicine) which is a standard for digital medical images. The injection device 110 is connected by wire or wirelessly to the sound detection device 190. For example, the injection device 110 is connected by wire to the sound detection device 190 via a cable not illustrated. Alternatively, the injection device 110 may be wirelessly connected to the sound detection device 190 according to Bluetooth (a registered trademark) standards.

The imaging device 150 is provided with an imaging unit 151 for exposing a patient to an X-ray in order to capture a fluoroscopic image of a subject, a control device 160 connected to the imaging unit 151, and a display 159 connected to the control device 160. The imaging unit 151 has a bed 153 on which the subject is placed, an X-ray source (not illustrated) that irradiates the subject with X-rays, and an X-ray detector (not illustrated) that detects X-rays transmitted through the subject. Then, the imaging unit 151 radiates the subject with X-rays and images a fluoroscopic image of the subject by back-projecting the inside of the subject based on the X-rays transmitted through the subject. Note that the control device 160 and the display 159 may also be configured integrally.

The injection device 110 includes an injection head 111 on which two syringes (not illustrated) each loaded with a drug solution (for example, a contrast agent and a physiological saline) are mounted and a console 120 serving as an injection control device for controlling the injection head 111. This console 120 is provided with a touch panel 129 that functions as an operation unit and a display unit that displays an injection state of the drug solution and the like. The console 120 and the injection head 111 are connected by wire via a metal cable, an optical cable, or the like. Note that the console 120 and the injection head 111 may be wirelessly connected and may be connected by, for example, a wireless method using a frequency band of 2.4 GHz to 5 GHz. Furthermore, a remote control device (not illustrated) such as a hand switch or the like can be connected by wire or wirelessly to the injection head 111 or the console 120.

The injection head 111 is mounted on a caster stand 112 and can be arranged by moving it near a bed 153 of the imaging device 150. A power source of the injection head 111 can be provided on the injection head 111 or the console 120. Furthermore, a power source independent of the injection head 111 can be provided separately, and the power source can be replaced with a battery. A ceiling suspension member can be provided instead of the caster stand 112, and the injection head 111 can be suspended from the ceiling via the ceiling suspension member.

The injection head 111 is provided with operation buttons such as a forward button, an acceleration button, a backward button, a check button, and a start button. Also, an operator can manually operate the injection head 111 by operating the operation buttons. Specifically, a pressing unit of the injection head 111 moves forward while the operator presses the forward button, and the pressing unit moves backward while the operator presses the backward button. When the operator presses the check button, the injection head 111 stands by in a state where injection is possible. Then, when the operator presses the start button, the injection head 111 moves the pressing unit forward to start injection of the drug solution. The operation buttons are also displayed on the touch panel 129 of the console 120. The operator can also operate the injection head 111 by operating the touch panel 129.

The injection head 111 has a drive mechanism that is not illustrated. For example, the drive mechanism includes a transmission mechanism connected to the shaft of the motor, a screw shaft connected to the transmission mechanism, a trapezoidal screw nut attached to the screw shaft, and an actuator connected to the trapezoidal screw nut. The transmission mechanism includes a pinion gear connected to the shaft and a screw gear connected to the screw shaft. Also, the transmission mechanism transmits rotation from the motor to the screw shaft. Thus, the rotation of the shaft of the motor is transmitted to the screw shaft via the pinion gear and the screw gear. Therefore, the screw shaft rotates according to the transmitted rotation, and the trapezoidal screw nut slides forward or backward according to the rotation of the screw shaft. The pressing unit moves forward or backward according to the sliding of the trapezoidal screw nut.

A piston that can slide within the syringe is attached to the syringe mounted on the injection head 111. The syringe may be either a syringe filled with a drug solution or an empty syringe not filled with a drug solution. When the motor rotates forward with a rear end of the piston abutting the pressing unit, the pressing unit pushes the piston in the forward direction. When the piston moves forward, the drug solution in the syringe is pushed out and injected into the body of the subject via an extension tube or the like connected to the tip of the syringe. Conversely, when the motor rotates backward, the pressing unit pulls the piston in the backward direction. Note that the syringe filled with the drug solution includes a pre-filled syringe filled with the drug solution in advance, a syringe obtained by manually filling the drug solution into an empty syringe by the operator, and a syringe obtained by filling the drug solution into an empty syringe by the operator using a suction device or a filling device. Furthermore, when an empty syringe is mounted on the injection device 110, the operator can fill the syringe with the drug solution by using the injection device 110, the suction device, or the filling device.

A data carrier such as an RFID (radio frequency identifier) or a bar code can be provided on the syringe. The data carrier records information of the filled drug solution and the like. The injection device 110 can read the recorded information from the data carrier via the injection head 111 and control the injection pressure of the drug solution and the like. For example, the console 120 calculates the optimum injection amount per body weight based on the read information of the drug solution (for example, iodine content or gadolinium content) and can display it on the touch panel 129.

When the drug solution is injected, the operator turns on the power source of the injection device 110, mounts a syringe on the injection head 111, and completes injection preparation. Then, the operator operates the operation buttons of the touch panel 129 or the injection head 111 and inputs data required for generating the injection protocol into the console 120. For example, the necessary data is physical data of the subject such as weight, height, body surface area, heart rate, and cardiac output, data of the type of drug solution, and the like. Note that the operator may turn on the power source of the injection device 110 after mounting the syringe. Furthermore, the operator may input the injection protocol, data of the drug solution, and the like into the console 120 from an external storage medium.

The console 120 stores in advance basic injection protocols such as an injection speed, an injection amount, an injection time, an injection maximum pressure (injection pressure limit value), and the like, and data of the drug solution. The console 120 determines an individual injection protocol suitable for an individual subject according to the inputted data and prestored data.

Furthermore, the console 120 displays predetermined data such as injection speed, injection amount, and injection time on the touch panel 129. The operator can check the contents of the determined injection protocol and change the contents if necessary. Note that the injection protocol may be locked by a password so that a third party cannot change it.

Furthermore, the console 120 may display the injection protocol on an external device such as a portable display or a tablet computer. These devices can be wirelessly connected to the injection head 111 or the console 120 according to a standard such as Bluetooth (a registered trademark) or Wi-Fi and used as a head display of the injection head 111.

The operator presses the check button of the injection head 111 or the touch panel 129 when completing the injection preparation and checking the injection protocol. Thereby, the injection head 111 stands by in a state where injection is possible. Then, the operator starts injection by pressing a start button of the injection head 111 or a remote control device, or a start button displayed on the touch panel 129. Then, the injection head 111 automatically injects the drug solution according to the injection protocol. When the injection head 111 has a head display, the operator can start injection by pressing a start button displayed on the head display.

Furthermore, the injection system 100 is provided with the sound detection device 190 for detecting imaging-related sound emitted by the imaging device 150 while imaging the subject and transmitting first data based on the imaging-related sound to the injection device 110. The sound detection device 190 is, for example, a microphone that transmits the detected sound as a sound signal in a digital format, or a sound sensor or the like that transmits the detection signal at a timing when the sound is detected. Also, the sound detection device 190 is connected by wire or wirelessly to the injection device 110, and is, for example, connected by wire to the injection device 110 via a cable (not illustrated). Furthermore, the sound detection device 190 is disposed in an operation room adjacent to the inspecting room when detecting the notification sound emitted by the control device 160 of the imaging device 150 as imaging-related sound. In this case, the sound detection device 190 can also be disposed near the control device 160. Furthermore, the sound detection device 190 is disposed in the inspecting room when detecting operation sound emitted by the imaging unit 151 of the imaging device 150 or guide sound played into the inspecting room. Alternatively, the sound detection device 190 may be a computer device having a sound detection function, for example, a personal computer or a mobile terminal device such as a tablet terminal. An example in which the sound detection device 190 is a microphone will be described below.

[Imaging Device]

Figure 2:
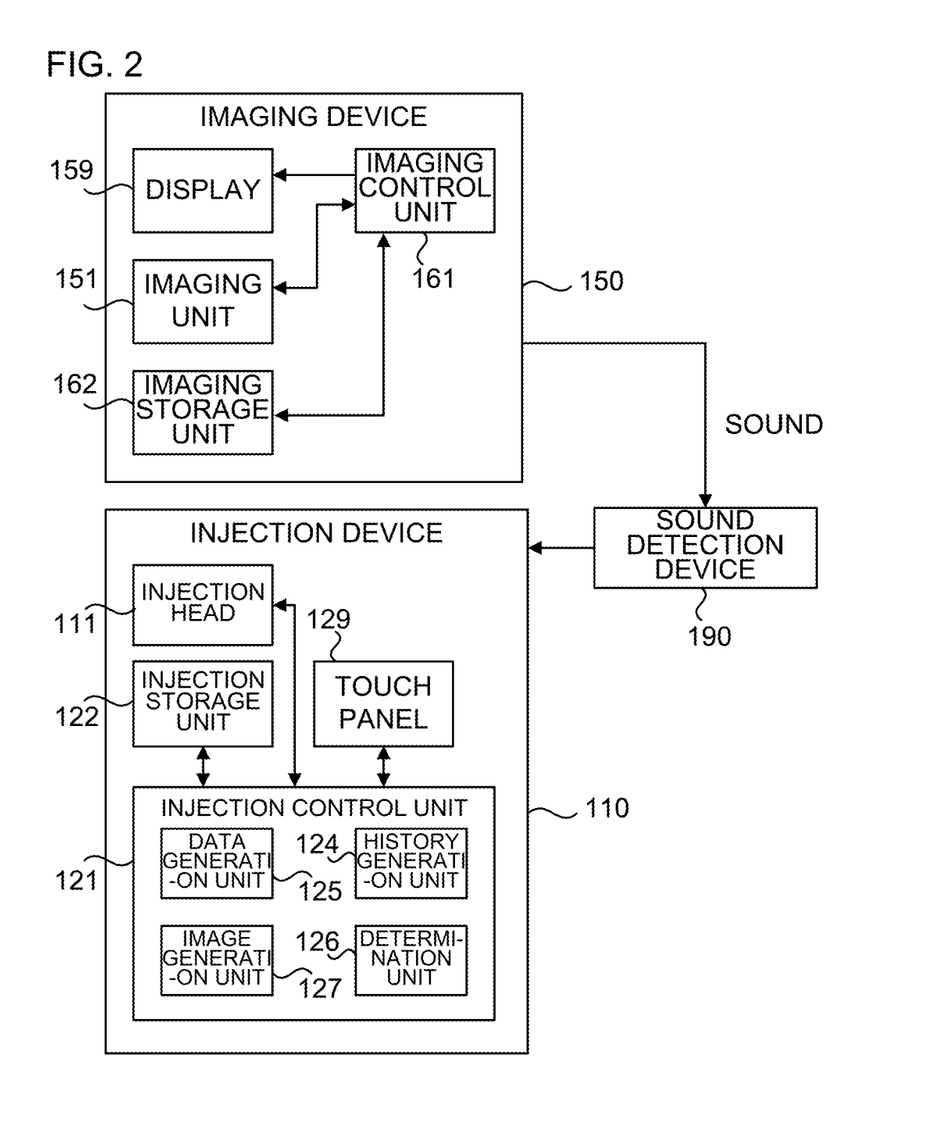
FIG. 2 is a schematic block diagram of an injection system.

As illustrated in FIG. 2, the imaging device 150 has both an imaging control unit 161 serving as a logical device and an imaging storage unit 162. These are all provided in a control device 160 that is a computer. The imaging control unit 161 has a CPU (central processing unit), an FPGA (field-programmable gate array), a drive circuit, and the like. Also, the imaging control unit 161 is realized as a logical device by combining the hardware resource of the control device 160 and a control program as a software resource. Note that the imaging device 150 and the injection device 110 can communicate with each other via an interface not illustrated.

For example, the imaging control unit 161 can add identification information (image ID) to a fluoroscopic image, add timing data of the exposure time to the fluoroscopic image, send fluoroscopic image data externally (for example, to the injection device 110), send timing data of the exposure time externally, send exposure amount data externally, send the identification information for the performed imaging externally, and send time sequence data of the imaging operation for perfusion inspecting externally. Furthermore, the imaging control unit 161 stores fluoroscopic image data, exposure time data, and the like in the imaging storage unit 162. Note that the control device 160 is provided with a user interface (not illustrated) that functions as the data input device.

The imaging storage unit 162 has RAM (random access memory) that is system work memory for the CPU to operate, ROM (read only memory) that stores a control program, system software, or the like, a hard disk drive, and the like.

Time data of exposure generated by the imaging device 150 includes, for example, time data of exposure start, time data of exposure end, and time data of elapsed time from the start to the end of exposure. This time data of exposure can be generated on the basis of time data of an NTP server, time data of other time servers for which time is set on the basis of the NTP server, time data of a prescribed device for which time is set on the basis of these servers, and time data of an imaging device 150 for which time is set based on these servers. Furthermore, the imaging device 150 can perform preliminary scanning in order to monitor the pixel value of the ROI (region of interest) which is the region of interest. Thereafter, the imaging device 150 performs a main scan when the pixel value of the region of interest reaches a preset threshold value. Furthermore, the imaging device 150 generates time data for each exposure when performing imaging a plurality of times in one inspection.

[Injection Device]

The injection device 110 is provided with an injection control unit 121 and an injection storage unit 122 which are disposed in a housing of the console 120, which is a computer. Furthermore, the injection device 110 has a touch panel 129 that is disposed on the outer surface of the housing of the console 120, displays a predetermined image, and functions as an operation panel. The injection control unit 121 has a CPU, an FPGA, a drive circuit, and the like. Furthermore, the injection storage unit 122 has RAM that is system work memory for the CPU to operate, ROM that stores a control program, system software, or the like, a hard disk drive, and the like.

The injection control unit 121 controls the entire injection device 110 based on a control program or the like stored in the injection storage unit 122 and comprehensively controls various processes including a data generation process that will be described later. That is, the injection control unit 121 can execute processing operations such as various calculations, controls, and distinctions according to the control program stored in the injection storage unit 122. Also, the injection control unit 121 and each functional unit included by the injection control unit 121 are realized as logical devices by combining a hardware resource of the console 120 and a control program as a software resource. Note that the injection control unit 121 can also perform control according to a program stored in an external storage medium such as a CD (compact disc), a server on the internet, or the like.

Furthermore, the injection control unit 121 is provided with a history generation unit 124 that generates injection history data of the drug solution, and a data generation unit 125 that acquires the first data received from the sound detection device 190. Here, the first data is acquired by the data generation unit 125 while converted into a digital signal. The history generation unit 124 stores the generated injection history data in the injection storage unit 122. This injection history data includes at least the elapsed time from the start of injection of the drug solution. Furthermore, the injection history data may include an injection speed and an injection amount. Moreover, the injection history data may include data such as a pressure graph indicating a relationship between the elapsed time and the injection pressure (including the estimated value), an injection speed graph indicating a relationship between the elapsed time and the injection speed, an injection amount graph indicating a relationship between the elapsed time and the injection amount, the injection time (duration of the injection), injection pressure, the type of drug solution, the iodine amount of the contrast agent, a body segment into which the drug solution has been injected or imaging site, identification information for identifying the drug solution injection, identification information for the subject, and a set injection protocol.

Each graph may be numerical data or image data, and the format thereof is not particularly limited. As one example, the identification information for identifying the drug solution includes a serial number for inspection, an injection operation ID, and an injection date and time. Also, the identification information of the subject includes a name, a subject ID, and a birth date. Furthermore, a part of the body such as the head, chest, abdomen, or the like is included in the body segment into which the drug solution has been injected. Moreover, the imaging site includes imaging locations in body segments such as the heart, liver, blood vessels, and the like.

The data generation unit 125 generates second data in which the first data is associated with the time data in common with the injection history data and stores this in the injection storage unit 122. Time data preset in the injection device 110 can be used as the common time data. For example, the data generation unit 125 can use the data of the elapsed time from the injection start or the injection start time as the common time data. As one example, the data generation unit 125 generates data from the injection start time and onward in the first data as data associated with the elapsed time from the injection start. Then, the data generation unit 125 stores the data as the second data in the injection storage unit 122. Alternatively, the data generation unit 125 may store data, in which the acquisition time of the first data is associated with the injection start time, in the injection storage unit 122 as the second data.

Furthermore, the injection control unit 121 is provided with a determination unit 126 that determines the imaging timing from the second data and an image generation unit 127 that generates a timing display image 170 (FIG. 3) based on the imaging timing and the injection history data. For example, the determination unit 126 specifies an imaging start timing from the second data and determines it to be the imaging timing. Additionally, the determination unit 126 may specify an imaging completion timing from the second data and determine it to be the imaging timing.

As one example, when a section in which the average value of the sound signals in a unit time (for example, 10 to 90 msec) exceeds a predetermined threshold value continues for a predetermined time (for example, 2 sec), the determination unit 126 determines that the timing at which the continuous section starts is the imaging start timing. Additionally, when a section in which the average value of the sound signals is below a threshold value continues for a predetermined time (for example, from 100 msec to 1 sec) after the imaging start timing is detected, the determination unit 126 determines that the timing at which the continuous section starts is the imaging end timing. Alternatively, the determination unit 126 may determine the timing at which the signal intensity of the sound signal is equal to or greater than a predetermined value, the timing at which the volume in the audible frequency band is equal to or greater than a predetermined value, or the timing at which the frequency of the sound signal is equal to or greater than a predetermined frequency, to be the imaging timing.

Then, the determination unit 126 stores the imaging timing in the injection storage unit 122 in association with the time data in common with the injection history data.

Time data preset in the injection device 110 can be used as this common time data as well. For example, the determination unit 126 uses the elapsed time from the start of injection as the common time data. In this case, the determination unit 126 stores information, that indicates how long time has elapsed from the start of injection to the imaging timing, in the injection storage unit 122. Furthermore, the determination unit 126 may use the data of the injection start time as the common time data. In this case, the determination unit 126 stores the time of the imaging timing in the injection storage unit 122 in a form that can be compared with the injection start time.

Figure 3:
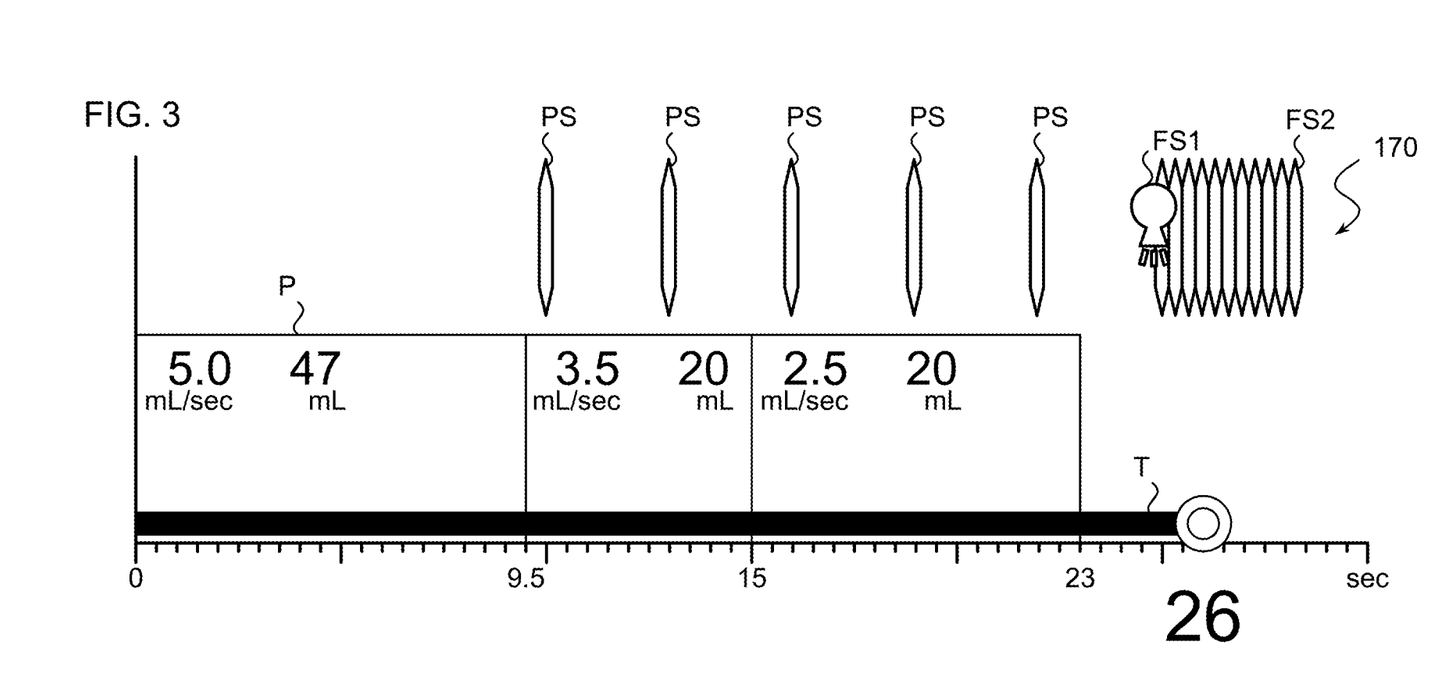
FIG. 3 is a schematic explanatory diagram of a timing display image.

As an example, the image generation unit 127 generates a timing display image 170 such as illustrated in FIG. 3. In this case, the image generation unit 127 combines indicators PS, FS1, and FS2 indicating the imaging timing with an elapsed time bar T indicating the elapsed time based on the injection history data. Also, when the timing display image 170 is generated, the image generation unit 127 stores the timing display image 170 in the injection storage unit 122 and displays the image on the touch panel 129. The horizontal axis of the timing display image 170 indicates an elapsed time (sec) with the injection start timing of the drug solution as a reference (zero). The image generation unit 127 includes the elapsed time bar T indicating an elapsed time and a protocol display column P indicating an injection protocol in the timing display image 170.

The protocol display column P illustrated in FIG. 3 shows that the injection rate is 5.0 mL/sec and the injection amount is 47 mL in a first phase in which a contrast medium is injected. Also, it shows that the injection rate is 3.5 mL/sec and the injection amount is 20 mL in a second phase in which a contrast medium is injected. Furthermore, it shows that the injection rate is 2.5 mL/sec and the injection amount is 20 mL in a third phase in which physiological saline is injected. Moreover, FIG. 3 illustrates an example in which five test scans (preliminary imaging) and one main scan (main imaging) are performed. In this example, the first test scan is performed when 10.0 sec have passed since the injection start. Also, the pixel value of the region of interest reaches a desired value when the fifth test scan is performed, and thus the imaging device 150 starts the main scan when 25.0 sec have elapsed from the injection start. Note that in the test scan, the exposure may be continuously performed, or the exposure may be intermittently performed at intervals of an extremely short time (for example, 0.5 sec).

The image generation unit 127 changes the timing display image 170 in accordance with the progress of the elapsed time. Specifically, as the timing display image 170, the image generation unit 127 changes the timing display image 170 such that the elapsed time bar T becomes longer as the elapsed time advances. For example, the example in FIG. 3 indicates a state, in which the elapsed time bar T displayed from zero is changed until 26 sec elapsed from the injection start. Also, when the test scan is started, the image generation unit 127 changes the timing display image 170 such that the imaging start timing of each test scan is indicated by the indicator PS. Furthermore, when the main scan is started, the image generation unit 127 changes the timing display image 170 such that the imaging start timing of the main scan is indicated by the indicator FS1. Then, when the main scan is finished, the image generation unit 127 changes the timing display image 170 such that the imaging end timing of the main scan is indicated by the indicator FS2.

Alternatively, the image generation unit 127 may include only the imaging start timing of the main scan or only the imaging start timing and imaging end timing of the main scan in the timing display image 170. That is, the image generation unit 127 need not include the imaging timing of the test scan in the timing display image 170. Note that a shape of the indicators PS, FS1, FS2 may each be an inverted triangle, a circle, an ellipse, an upward triangle, a rectangle, a polygon, or a star. Furthermore, the imaging start timing may be a text indicating time rather than a graphic (for example, a character string such as "10.0"). Moreover, the imaging start timing may be displayed by filling an area indicating the imaging time with a predetermined color that differs from the color scheme in the timing display image.

[Sound Detection Device]

The sound detection device 190 detects imaging-related sound which is a sound emitted by the imaging device 150. Furthermore, when detecting the imaging-related sound, a sound signal is generated as first data and transmitted to the injection device 110. That is, the sound detection device 190 transmits the first data obtained by converting inputted sound into a sound signal to the injection device 110. The imaging-related sound is, for example, a notification sound emitted by the control device 160 to notify of the timing of imaging, an operation sound emitted by the imaging device 150 at the time of imaging, instruction sound emitted by the imaging device 150 at the time of imaging, or the like. The notification sound is a sound emitted by the control device 160 between the start and end of imaging and is mainly detected in the operation room. The operation sound is a sound emitted by the imaging unit 151 of the imaging device 150 during imaging and is mainly detected in the inspecting room. The instruction sound is, for example, sound guidance such as "please hold your breath" that is played after the contrast medium is injected and is mainly detected in the inspecting room. The sound guidance is electronic sound emitted by the imaging device 151, pre-recorded sound, or sound uttered by an operator in the operation room. The imaging device 150 performs exposure immediately after the sound guidance.

The sound detection device 190 may start detection of the sound and transmission of the first data according to a detection start command received from the injection control unit 121 of the injection device 110. Due to the injection control unit 121 transmitting the detection start command simultaneously with the start of the injection of the drug solution, it is possible to synchronize time of the injection history data and time of the first data with the injection start timing as a reference. Thereby, the data generation unit 125 can generate the second data indicating when the sound is detected with the injection start timing as a reference.

Figure 4:
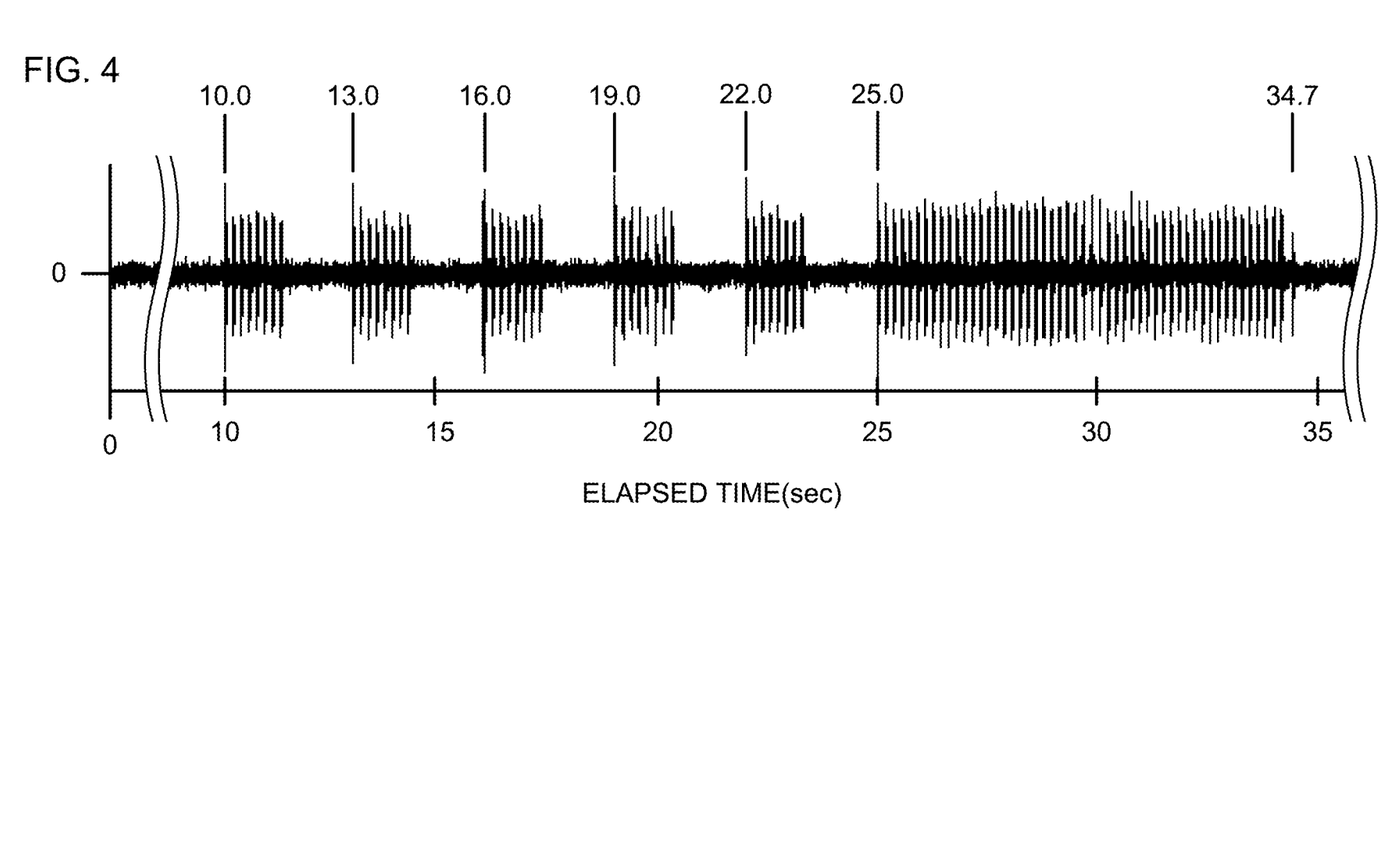
FIG. 4 is a graph showing an amplitude of a sound signal.

The first data may include characteristic data indicating characteristics of the imaging-related sound emitted by the imaging device 150. For example, the characteristic data indicates characteristics such as a volume or sound pressure level of the sound, a frequency, and the like. As an example, FIG. 4 illustrates the amplitude of the sound signal transmitted by the sound detection device 190 as a graph. In FIG. 4, the horizontal axis indicates time (sec), and the vertical axis indicates the amplitude of the sound signal. Here, the amplitude of the sound signal corresponds to a volume (or a sound pressure level). In FIG. 4, the sound is in a substantially silent state before 10.0 sec have elapsed since injection was started, and the sound detection device 190 does not detect a notification sound that notifies of imaging. Moreover, the sound detection device 190 detects first to sixth notification sounds at timings of 10.0 sec of elapsed time, 13.0 sec of elapsed time, 16.0 sec of elapsed time, 19.0 sec of elapsed time, 22.0 sec of elapsed time, and 25.0 sec of elapsed time.

[Data Generation]

Figure 5:
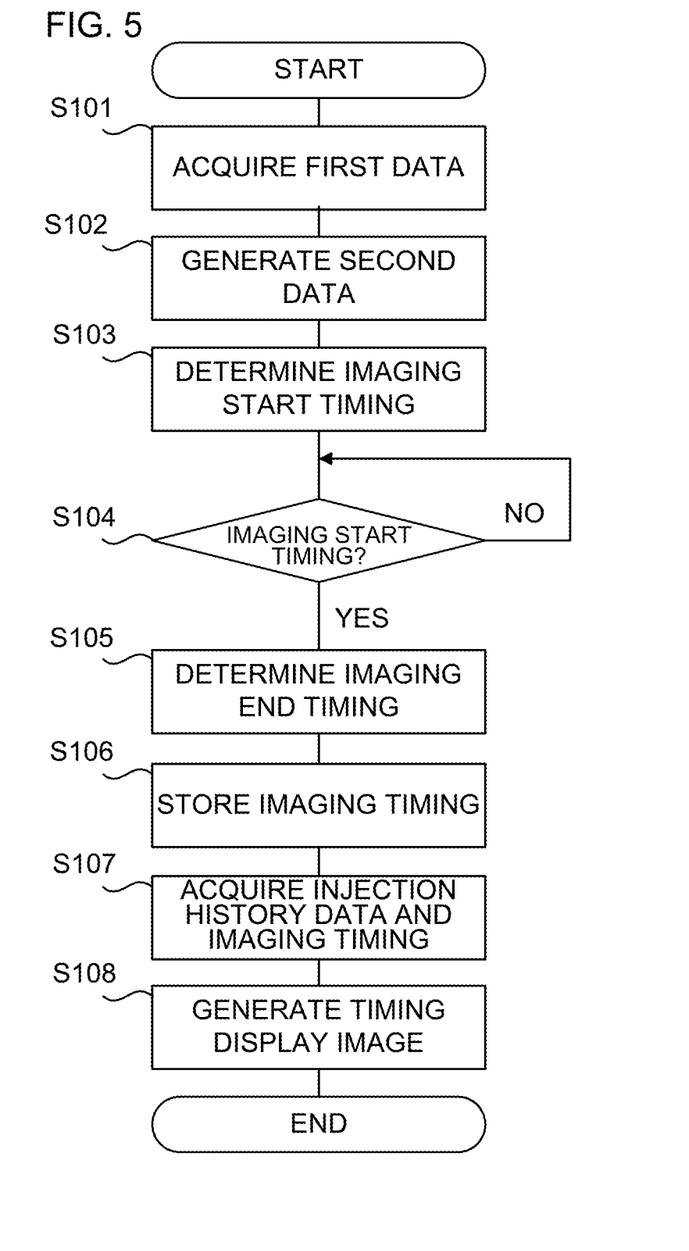
FIG. 5 is a flowchart for describing data generation.

The data generation performed by the injection device 110 will be described with reference to the flowchart in FIG. 5. First, the operator turns on the power source of the injection device 110 to boot up the sound detection device 190. Then, when the injection preparation is completed, the operator presses the start button of the injection head 111 to start the injection. The injection control unit 121 injects the drug solution into the injection head 111 according to the injection protocol in response to the operation of the operator.

The data generation unit 125 acquires the first data from the sound detection device 190 simultaneously with the start of injection (S101). Prior to the acquisition, the sound detection device 190 converts the detected sound into a sound signal and transmits it as the first data to the injection device 110. The data generation unit 125 generates the second data by associating the received first data with the time data in common with the injection history data (S102). Then, the data generation unit 125 stores the generated second data in the injection storage unit 122. Alternatively, the sound detection device 190 may start detection when receiving a detection start command from the injection control unit 121. In this case, the sound detection device 190 may, together with storing the first data, also send the first data to the injection device 110 when a predetermined time has elapsed since receiving the detection start command.

The imaging control unit 161 causes the imaging unit 151 to image an imaging region of a subject in accordance with a predetermined imaging plan set in advance. That is, the imaging control unit 161 causes the imaging unit 151 to image the subject at a timing at which the contrast medium reaches the imaging site after a predetermined time has elapsed from the start of injection. Also, the imaging control unit 161 obtains fluoroscopic image data of the imaging site and stores the fluoroscopic image data in an imaging storage unit 162. Furthermore, the imaging control unit 161 may store the data of the fluoroscopic image in an external storage device. Note that the imaging control unit 161 can also store the time data of the imaging start timing and the time data of the imaging end timing in the imaging storage unit 162 or the external storage device.

The data generation unit 125 stops the acquisition of the first data or stops the generation of the second data after a predetermined time (for example, 60 sec) has elapsed from the start of injection or the end of injection. This is because imaging is performed when the contrast medium reaches the imaging site after a predetermined time has elapsed from the start of injection or the end of injection, and imaging is not performed thereafter. Therefore, the predetermined time is set in advance to a time sufficient for the contrast medium to reach the imaging site. Alternatively, the data generation unit 125 may store the first data until a predetermined time elapses from the start of injection or the end of injection in the injection storage unit 122 and generate the second data after the predetermined time elapses.

The history generation unit 124 of the injection device 110 generates injection history data of the drug solution during drug solution injection, after drug solution injection, or both. For example, the injection history data includes time data such as: the injection start time, the injection end time, and the elapsed time from the injection start; injection pressure data (or a pressure graph) indicating the injection pressure for each elapsed time from the injection start; injection amount data (or an injection amount graph) indicating the injection amount for each elapsed time from the injection start; and injection speed data (or an injection speed graph) indicating the injection speed for each elapsed time from the injection start. Also, the history generation unit 124 stores the generated injection history data in the injection storage unit 122.

The determination unit 126 determines the imaging start timing from the second data generated by the data generation unit 125 (S103). Specifically, when a section in which the average value of the sound signals exceeds a predetermined threshold value continues for a predetermined time (YES in S104), the determination unit 126 determines that the timing at which the continuous sections start is the imaging start timing. Then, when a section in which the average value of the sound signals is lower than the threshold value continues for a predetermined time after the imaging start timing is detected, the determination unit 126 determines that the timing at which the continuous sections start is the imaging end timing (S105). Conversely, when the section in which the average value of the sound signals exceeds a predetermined threshold value does not continue for a predetermined time (NO at S104), the determination unit 126 determines whether another section of the second data is the imaging start timing. Note that when the first data and the second data do not include characteristic data indicating characteristics of the imaging-related sound, for example, when the data generation unit 125 acquires the detection signal as the first data, the determination unit 126 determines that the timing at which the first data is received is the imaging start timing. The determination unit 126 determines that the timing when the first data is no longer received is the imaging end timing.

Then, the determination unit 126 stores the imaging start timing and the imaging end timing in the injection storage unit 122 as the imaging timing (S106). The image generation unit 127 acquires the imaging timing determined by the determination unit 126 and the injection history data generated by the history generation unit 124 from the injection storage unit 122 (S107). The data generation unit 125 combines the imaging timing with the injection history data to generate the timing display image 170 (S108). Then, the data generation unit 125 stores the generated timing display image 170 in the injection storage unit 122, and data generation ends. Note that the injection control unit 121 may store at least one of the second data and the timing display image 170 generated by the data generation unit 125 in an external storage device such as a PACS in association with information identifying the subject, a fluoroscopic image, or the like. As one example, by displaying the fluoroscopic image, the injection protocol, and the exposure timing on one screen, these can be used as information contributing to the evaluation of the fluoroscopic image. Furthermore, by displaying the exposure timing of the test scan on the same screen, it is possible to determine whether the settings of the region of interest are appropriate. Furthermore, this can be used to evaluate simulation results of the injection state.

Then, the image generation unit 127 displays the timing display image 170 on the touch panel 129 and changes the timing display image 170 according to the progress of the elapsed time. Note that the image generation unit 127 may generate the timing display image 170 so as to include various data such as a subject ID, subject name, subject sex, subject age, inspection date and time, drug solution name, imaging region, and injection pressure as the injection history data in addition to the elapsed time and the injection protocol.

The operator can use the timing display image 170 to accurately ascertain the imaging start timing with the start of injection as a reference. Therefore, the operator can grasp the time from the start of injection until the contrast medium reaches the imaging site by evaluating the fluoroscopic image. In particular, the arrival time of the contrast medium varies greatly depending on the subject, and therefore, by ascertaining the arrival time of each subject, an excellent image can be captured. Furthermore, since the injection history data and the imaging timing are displayed by being included in one timing display image 170, the operator can check the correlation between the injection state and the imaging timing for the subject and the fluoroscopic image. Accordingly, even when the desired fluoroscopic image cannot be obtained, the operator can determine the cause (for example, the arrival time of the contrast medium is early). Furthermore, the second data can be used for various applications such as simulation of the injection state, quality determination of the injection result or the fluoroscopic image, and multivariate analysis.

[Program]

A data generation program is stored as part of a control program in the injection storage unit 122 of the first embodiment. The injection control unit 121 executes various processes in accordance with the data generation program, whereby the history generation unit 124, the data generation unit 125, the determination unit 126, and the image generation unit 127 are logically realized as various functions in the injection control unit 121. This data generation program is a data generation program for causing a computer to generate data related to the time data in common with the injection history data of the drug solution. The data generation program causes the computer to function as the data generation unit 125 for acquiring the first data based on sound during the imaging of the subject and as the history generation unit 124 for generating injection history data. Furthermore, the data generation unit 125 generates second data in which the first data is associated with the time data in common with the injection history data.

According to the first embodiment described above, the injection system 100 can generate data that is associated with the time data in common with the injection history data of the drug solution. That is, the injection system 100 can generate the second data in which the first data is associated with the time data in common with the injection history data without acquiring the time data from the imaging device 150. Thus, the injection system 100 combines the imaging timing synchronized with the time data of the injection device 110 to the injection history data to generate the timing display image 170. According to the timing display image 170, the time from the injection start to the imaging start can be visually understood.

Furthermore, when imaging after a predetermined delay time has elapsed after the injection is started, the imaging start timing can be set by referencing the timing display image 170 and the fluoroscopic image at the time of the previous imaging. Thus, the imaging start timing can be optimized in accordance with individual differences of the subject. Furthermore, the required amount of contrast agent can be reduced by starting imaging at an appropriate timing. Thereby, the risk of side effects and cost can be reduced. Furthermore, because there is no need to perform so-called real prep, the amount of radiation exposure can be reduced.

[Modifications]

The sound detection device 190 may transmit data indicating at least one of detection start or detection end of sound that satisfies a predetermined condition to the injection device 110 as the first data. For example, the sound detection device 190 has a microphone that detects sound and a processor that functions as a detection control unit. Then, the detection control unit determines the detection start and detection end from the detected imaging-related sound. Furthermore, when the detection control unit determines that a detection starts, the detection control unit transmits data indicating detection start to the injection device 110 by serial communication. Moreover, when the detection control unit determines that a detection end, the detection control unit transmits data indicating detection end to the injection device 110 by serial communication. To describe the sixth notification sound in FIG. 4 as an example, the sound detection device 190 transmits a signal indicating the detection start at the timing of 25.0 sec of elapsed time to the injection device 110. Furthermore, the sound detection device 190 transmits a signal indicating detection end at the timing of 34.7 sec of elapsed time to the injection device 110. As one example, the detection control unit determines that a predetermined condition is satisfied when the sound pressure level exceeds a predetermined level.

Furthermore, when the determination unit 126 of the injection device 110 acquires data indicating the detection start, the determination unit 126 determines that it is the imaging start timing, and the timing is associated with the time data in common with the injection history data and stored in an injection storage unit 122. Also, when the determination unit 126 acquires the data indicating the detection end, the determination unit 126 determines that it is the imaging end timing, and the imaging end timing is associated with the time data in common with the injection history data and stored in the injection storage unit 122. Furthermore, the determination unit 126 determines that the main scan has been performed when the time from the imaging start timing to the imaging end timing exceeds a predetermined time. Also, the determination unit 126 stores the imaging start timing and imaging end timing of the main scan in an injection storage unit 122 in association with the time data in common with the injection history data. As an example, the predetermined time is set between 2 sec and 5 sec and is preferably set to 2 sec. The image generation unit 127 of the injection device 110 forms a timing display image so as to indicate the imaging start timing and imaging end timing of each of the test scan and the main scan by an indicator.

The present invention was described above with reference to each embodiment, but the present invention is not limited to the embodiments described above. The present invention includes inventions changed within the scope that does not contradict the present invention and inventions equivalent to the present invention. Furthermore, each embodiment and each modification can be appropriately combined within the scope that does not contradict the present invention.

For example, a computer external to the injection device 110 may be provided with at least one of the determination unit 126 and the image generation unit 127. When an external computer is provided with the determination unit 126, the determination unit 126 acquires the first data from the sound detection device 190 or acquires the second data from the injection device 110. Furthermore, when an external computer is provided with the image generation unit 127, the image generation unit 127 acquires the injection history data from the injection device 110.

Furthermore, the injection system 100 may generate data at a predetermined timing set in advance. For example, the injection system 100 may start data generation at the same time as the injection start, or may start data generation at a timing when a predetermined time has elapsed since the injection start. Furthermore, the sound detection device 190 may cause an external or internal storage device to temporarily store the generated first data. When the first data is stored in the storage device, the data generation unit 125 may acquire the first data from the storage device. Furthermore, the data generation unit 125 may cause a storage device external to the injection device 110 to store the second data. When the second data is stored in an external storage device, the determination unit 126 may acquire the second data from the external storage device.

The injection device 110 may be provided with a sub-display provided in the injection head 111 or in the vicinity of the injection head 111. Furthermore, the injection device 110 may cause the sub-display to display the imaging timing determined by the determination unit 126 during and/or after inspection. Thus, the operator or the subject can check the imaging timing during and/or after the inspection. In this case, the imaging timing may be displayed by the imaging time in a text format or a graph.

Note that the sound detection device 190 and the console 120 can be configured integrally. The sound detection device 190 and the injection head 111 can be configured integrally. For example, the sound detection device 190 can be attached to a housing of the console 120 or a housing of the injection head 111. Furthermore, the sound detection device 190 may be configured to boot up at the same time as the injection start to start sound detection and to end sound detection when a predetermined time has elapsed from the injection start. In this case, the sound detection device 190 transmits the detected first data to the injection device 110 after booting up.

REFERENCE SIGNS LIST

100: an injection system, 110: an injection device, 124: a history generation unit, 125: a data generation unit, 126: a determination unit, 127: an image generation unit, 190: a sound detection device

The invention claimed is:

1. An injection system comprising:
    an injection device that injects a drug solution; and
    a sound detection device that detects sound emitted in a room, in which the sound detection device is disposed, while a subject is being imaged and generates first data based on the sound,
    wherein the injection device has a computer that acquires the first data and that generates injection history data of the drug solution, and
    the computer generates second data in which the first data is associated with time data in common with the injection history data.

2. The injection system according to claim 1, wherein the computer determines imaging timing from the second data, and generates a timing display image based on the imaging timing and the injection history data.

3. The injection system according to claim 1, wherein the first data includes characteristic data indicating characteristics of imaging-related sound emitted by an imaging device.

4. The injection system according to claim 1, wherein the injection history data includes elapsed time from start of injection of the drug solution.

5. The injection system according to claim 1, wherein the sound detection device is disposed away from the subject.

6. The injection system according to claim 1, wherein the sound is emitted by an imaging device that images the subject.

7. A data generation method that causes a computer to generate data that is associated with time data in common with injection history data of a drug solution, the data generation method comprising:
    detecting sound emitted in a room, in which a sound detection device is disposed, while a subject is being imaged;
    acquiring first data based on the sound;
    generating the injection history data; and
    generating second data in which the first data is associated with the time data in common with the injection history data.

8. A non-transitory computer readable storage medium having a data generation program that causes a computer to generate data that is associated with time data in common with injection history data of a drug solution, the data generation program causing the computer to:
    acquire first data based on sound emitted in a room, in which a sound detection device is disposed, during imaging of a subject; and
    generate the injection history data,
    wherein the computer generates second data in which the first data is associated with the time data in common with the injection history data.

* * * * *